United States Patent [19]

Ogata et al.

[11] Patent Number: 5,068,491
[45] Date of Patent: Nov. 26, 1991

[54] BUS BAR FOR POWER SUPPLY WITH COOLANT FLOW PASSAGES

[75] Inventors: Yoshinori Ogata, Matsudo; Yutaka Kikuchi, Mito; Tsutomu Makino, Katsuta; Teruo Kobayashi; Hirotaka Yoshida, both of Yokohama, all of Japan

[73] Assignees: Doryokuro Kakunenryo Kaihatsu Jigyodan; Ishikawajima-Harima Heavy Industries Co., Ltd.; Dai-Ichi High Frequency Co., Ltd., all of Tokyo, Japan

[21] Appl. No.: 548,550

[22] Filed: Jul. 5, 1990

[30] Foreign Application Priority Data

Jul. 5, 1989 [JP] Japan ................. 1-79283[U]

[51] Int. Cl.⁵ .............................................. H02G 5/10
[52] U.S. Cl. ................................ 174/16.2; 174/15.6;
174/129 B; 174/133 B; 219/10.491; 219/10.51;
361/378; 361/379
[58] Field of Search ............... 174/15.6, 16.2, 129 B,
174/133 B, 32, 102 R, 102 P; 219/10.491, 10.51,
10.75; 361/378, 379

[56] References Cited

U.S. PATENT DOCUMENTS

| | | | |
|---|---|---|---|
| 2,457,845 | 1/1949 | Strickland, Jr. | 219/10.51 |
| 2,740,095 | 3/1956 | Somes | 174/32 X |
| 3,946,348 | 3/1976 | Schleich | 174/125.1 X |
| 4,321,422 | 3/1982 | Rogers et al. | 174/16.2 X |

FOREIGN PATENT DOCUMENTS

| | | | |
|---|---|---|---|
| 460642 | 6/1928 | Fed. Rep. of Germany | 174/15.6 |
| 1188494 | 4/1970 | United Kingdom | 174/15.6 |

Primary Examiner—Morris H. Nimmo
Attorney, Agent, or Firm—Oblon, Spivak, McClelland, Maier & Neustadt

[57] ABSTRACT

A bus bar for power supply is comprised of a pipe-shaped outer conductor and at least one inner conductor inserted therein. The inner conductor is also formed in a pipe shape and serves as a coolant flow passage. Insulation is interposed between the outer conductor and the inner conductor to electrically isolate them from each other.

13 Claims, 1 Drawing Sheet

BUS BAR FOR POWER SUPPLY WITH COOLANT FLOW PASSAGES

BACKGROUND OF THE INVENTION

The present invention relates to a bus bar for power supply with coolant flow passages.

Hitherto, a bus bar for power supply used in a high frequency heating device has a structure for reduction in inductance, for instance, as shown in FIG. 3. The structure is such that both conductors 1, 2, making a pair, are shaped like plates and arranged close to each other with their surfaces opposed to each other. An insulator 3 is interposed between the opposed surfaces of the conductors, and these elements are fixed together by bolts 4 which are made of an insulation material. Pipes 5 for cooling are fixed to respective outsides of the conductors 1, 2 by means of brazing or the like.

In such a bus bar, however, there are problems that the leakage of magnetic fluxes occurs at both sides of the conductors 1, 2, the special insulation bolts 4 are necessary, and the work efficiency of brazing or the like is low. Further, in such a case where a high frequency heating coil is divided into plural zones and switched over to be heated at every zone, it is desirable to form a bus bar which uses plural conductors and is capable of supplying power while switching the combination of the conductors. In this case, however, it is difficult to unite the respective conductors into one body while arranging them opposite one another, and this gives rise to another problem that the bus bar becomes complicated in structure and large in size.

SUMMARY OF THE INVENTION

The invention has been accomplished to effectively solve the above problems, and has an object of eliminating leakage of magnetic fluxes from a bus bar, simplifying the structure thereof and reducing the same in size.

To this end, according to the invention, a bus bar for power supply comprises an outer conductor formed in a pipe shape, at least one inner conductor inserted in the outer conductor, the inner conductor being formed in a pipe shape smaller than the outer conductor and serving as a coolant flow passage, and an insulation layer interposed between opposite surfaces of adjacent conductors to electrically isolate the conductors from each other.

The bus bar for power supply of the invention can achieve the following meritorious results.

(1) Since the outer conductor surrounds the inner conductor, the occurrence of leakage of magnetic fluxes can effectively be eliminated, and the influence thereof on other electric equipment can be lessened.

(2) As the respective conductors are formed in the pipe shapes and the inner conductor is inserted in the outer conductor, in either case when only one inner conductor is provided or plural inner conductors are provided, the overall peripheral surface of each conductor can be used to form an opposite surface to an adjacent conductor, thereby reducing the inductance;

(3) As the overall peripheral surface of each conductor can be utilized and the hollow portion of the inner conductor forms the coolant flow passage, the structure of the bus bar can be simplified and be reduced in size.

Further, in the case where plural inner conductors are provided, opposite conductors may be used for power supply.

DETAILED DESCRIPTION OF THE PREFERRED EMBODIMENTS

Description will now be made of the bus bars according to embodiments of the invention, which are respectively applied to high frequency heating devices, with reference to FIGS. 1 and 2.

Figure 1:
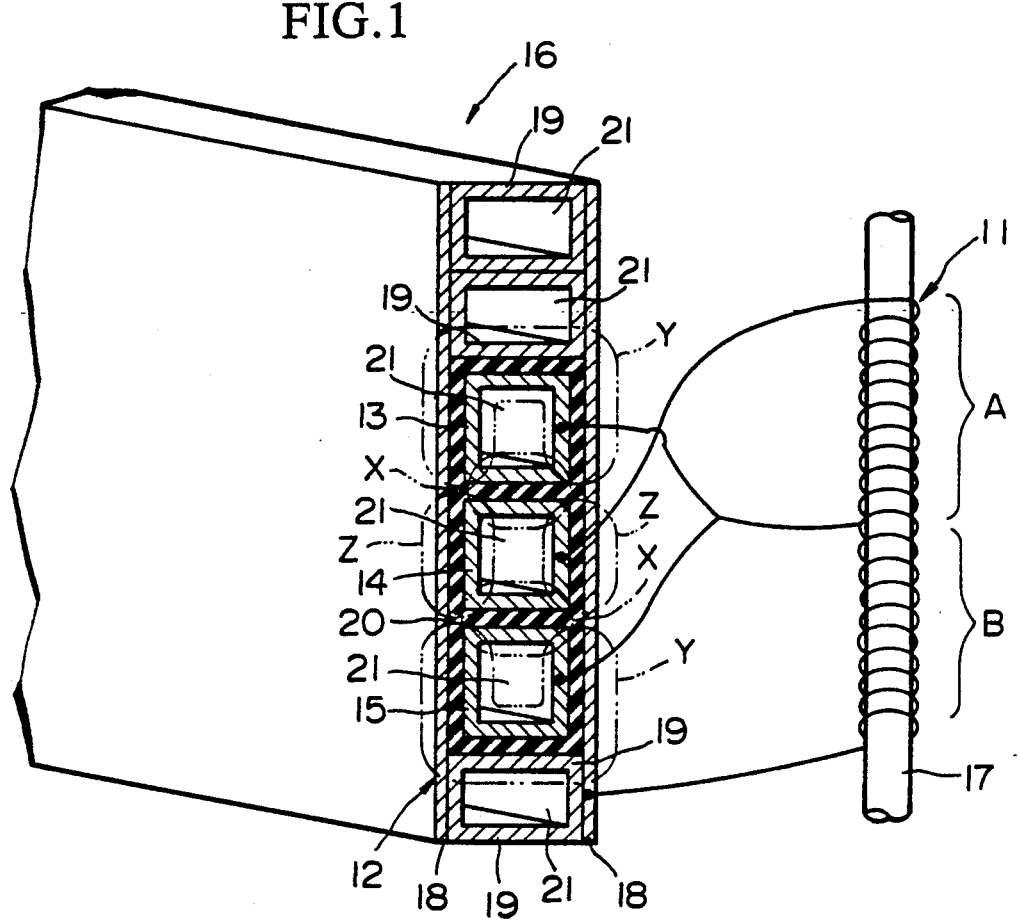
FIG. 1 is a sectional perspective view showing the bus bar for power supply according to an embodiment of the invention which is applied to a high frequency heating device.

FIG. 1 shows an example where a heating coil 11 is divided into two zones A and B and the supply of power thereto can be performed by the bus bar 16 while being switched to any one of three cases of heating the portion A, heating the portion B, and heating both the portions A and B. The bus bar 16 is comprised of an outer conductor 12 and three inner conductors 13, 14 and 15 which are inserted in the outer conductor. Reference numeral 17 denotes an object to be heated.

In the bus bar 16, the outer conductor 12 is formed in a generally flat rectangular-pipe shape by disposing plural partition walls 19 between both end portions of a pair of side plates 18. The inner conductors 13, 14 and 15 are respectively comprised of square pipes each of which is smaller in size than the outer conductor 12. The inner conductors 13, 14 and 15 are inserted side by side at spaces from one another in a central one of hollow cavities of the outer conductor 12, which are respectively surrounded by the side plates 18 and the partition walls 19. In the case of the embodiment shown in FIG. 1, the partition walls 19 of the outer conductor 12 are formed by fixedly attaching square pipes between the side plates 18. Further, an insulation layer 20, which is made of a powder of magnesium oxide or the like, or a plate of mica or the like, is placed in every space between adjacent ones of the conductors 12-15 to electrically isolate them from one another. The hollow cavities of the outer conductor 12 at both sides thereof and those of the inner conductors 13, 14 and 15 form coolant flow passages 21 for allowing cooling water to pass therethrough.

When carrying out high frequency heating by using the bus bar 16 thus comprised, with the wiring as shown in FIG. 1, the bus bar can supply power in the respective combinations of: (1) the central inner conductor 14 and the inner conductors 13, 15 on both sides thereof with respect to the portion A of the heating coil 11; (2) both the side inner conductors 13, 15 and the outer conductor 12 with respect to the portion B; and (3) the central inner conductor 14 and the outer conductor 12 with respect to the whole heating coil. Further, adjacent ones of the conductors 12-15 face each other in the regions indicated in FIG. 1 by: X in the case (1); Y in the case (2); or Z in the case (3), so that the inductance can be decreased. In this embodiment, when the inner conductor or conductors and the outer conductor are used in a pair as in the case of above (2) and (3), these conductors are coaxially arranged and the influence of magnetic fields between the conductors can greatly be lessened. Further, as will be understood from the above regions X, Y and Z, the overall surfaces of the respective conductors 12-15 can effectively be used as opposite surfaces. The entire surfaces of the respective conductors 12-15 are cooled by the cooling water which flows through the coolant flow passages of the hollow cavities in the conductors, so that any temperature rise thereof can be suppressed.

Moreover, since the respective inner conductors 13, 14 and 15 are covered by the outer conductor 12, it is possible to eliminate the occurrence of leakage of magnetic fluxes, thereby effectively preventing a heating phenomenon and the generation of noises with respect to other electric equipment and the like which lie close to the bus bar 16.

Additionally, as only the outer conductor 12 is exposed to the environment, all portions of the outside of the bus bar 16 become the same electric potential and, therefore, it is easy to support the bus bar 16 even when supporting the same by another member.

Figure 2:
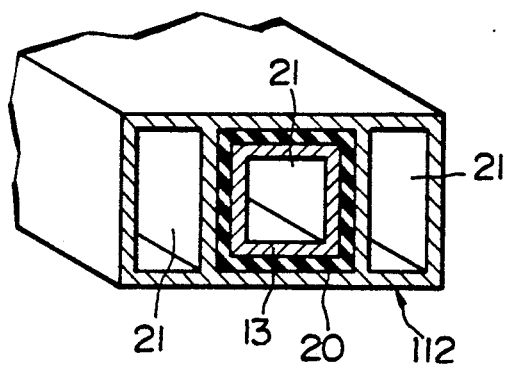
FIG. 2 is sectional perspective view showing the power supply bus bar according to another embodiment of the invention.
Figure 3:
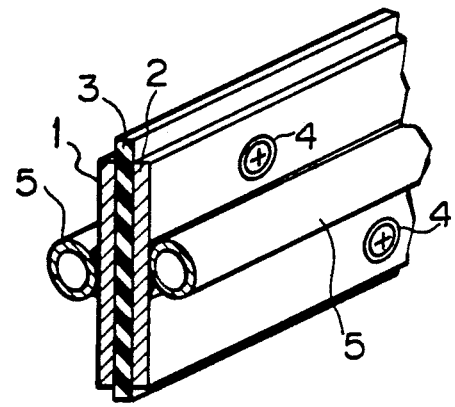
FIG. 3 is a sectional perspective view of a conventional bus bar for power supply.

On the other hand, FIG. 2 shows another example where only one inner conductor 13 is inserted in an outer conductor 112. The outer conductor 112 differs from the outer conductor 12 of the first embodiment in that partitions of the conductor 112 are integrally formed with side plates thereof. The other components and structure of the second embodiment are substantially the same as those of the first embodiment and, therefore, are denoted by the same reference numerals in FIG. 2. Also in this embodiment, the overall periphery of the inner conductor 13 faces the outer conductor 112, so that the opposite surfaces of a large area can be obtained and the completely coaxial type bus bar can be formed. In this case, both the conductors 112, 13 do not have to necessarily be angular in shape, and may be formed in circular shapes.

Incidentally, the number of the coolant flow passages may be set in accordance with the relation between a flow rate of the cooling water and the heat capacity of the conductors. In some case, the coolant flow passages provided in the outer conductor may be omitted.

What is claimed is:

1. A bus bar for power supply comprising an outer conductor formed in a pipe shape, at least one inner conductor inserted in said outer conductor, and an insulation layer filling every space between opposite surfaces of adjacent conductors for electrically isolating said conductors from each other; said inner conductor being formed in a pipe shape smaller than said outer conductor and serving as a coolant flow passage;

wherein said outer conductor is made up of a pair of side plates and at least two partition members fixedly interposed between said side plates, said partition members being respectively situated at opposite ends of said side plates to define in cooperation therewith a hollow portion which is rectangular in cross-section, each partition member being formed in a pipe shape which has a rectangular cross-section to form a coolant flow passage.

2. The bus bar according to claim 1, wherein plural inner conductors of pipe shape are provided and arranged side by side in said rectangular hollow portion of the outer conductor, each inner conductor having a square cross section.

3. A bus bar for power supply comprising an outer conductor formed in a pipe shape, at least one inner conductor inserted in said outer conductor, and an insulation layer filling every space between opposite surfaces of adjacent conductors for electrically isolating said conductors from each other; said inner conductor being formed in a pipe shape smaller than said outer conductor and serving as a coolant flow passage;

wherein said outer conductor has at least two partitions provided therein to define a central hollow portion, which is square in cross-section and other hollow portions on both sides of said central hollow portion, said side hollow portions forming coolant flow passages.

4. The bus according to claim 3, wherein plural inner conductors of pipe shape are provided and arranged side by side in said outer conductor.

5. The bus bar according to claim 3, wherein said inner conductor is similar in cross section to said central hollow portion of the outer conductor.

6. A bus bar for power supply comprising an outer conductor, a plurality of inner conductors inserted in said outer conductor, and an insulation layer filling every space between opposite surfaces of adjacent conductors for electrically isolating said conductors from each other;

said inner conductor and outer conductor being formed in a rectangular cross-sectional pipe shape, and conductor surfaces being arranged parallel to each other;

said inner conductor serving as a coolant flow passage.

7. A bus bar for power supply according to claim 6, wherein said inner conductors have the same cross-section.

8. A bus bar for power supply according to claim 7, wherein said inner conductors are arranged side by side to each other.

9. A bus bar for power supply according to claim 8, wherein at least three inner conductors are provided.

10. A bus bar for power supply according to any one of claims 3, and 7 to 9, wherein said outer conductor comprises two side plates and two partition walls, said partition walls are formed in a block shape and inserted at edge portions between said side walls.

11. A bus bar for power supply according to claim 10, wherein said partition walls are formed in a pipe shape with a rectangular cross-section.

12. A bus bar for power supply according to claim 6, wherein the cross-section of said inner conductor is similar to the cross-section of the inner space of said outer conductor.

13. A bus bar for power supply according to claim 6 or 12, wherein said outer conductor comprises a coolant passage.

* * * * *